Oct. 12, 1948.  C. M. OSTERHELD  2,450,983
HEAT STORAGE CONTROL SYSTEM
Filed April 27, 1945  2 Sheets-Sheet 1
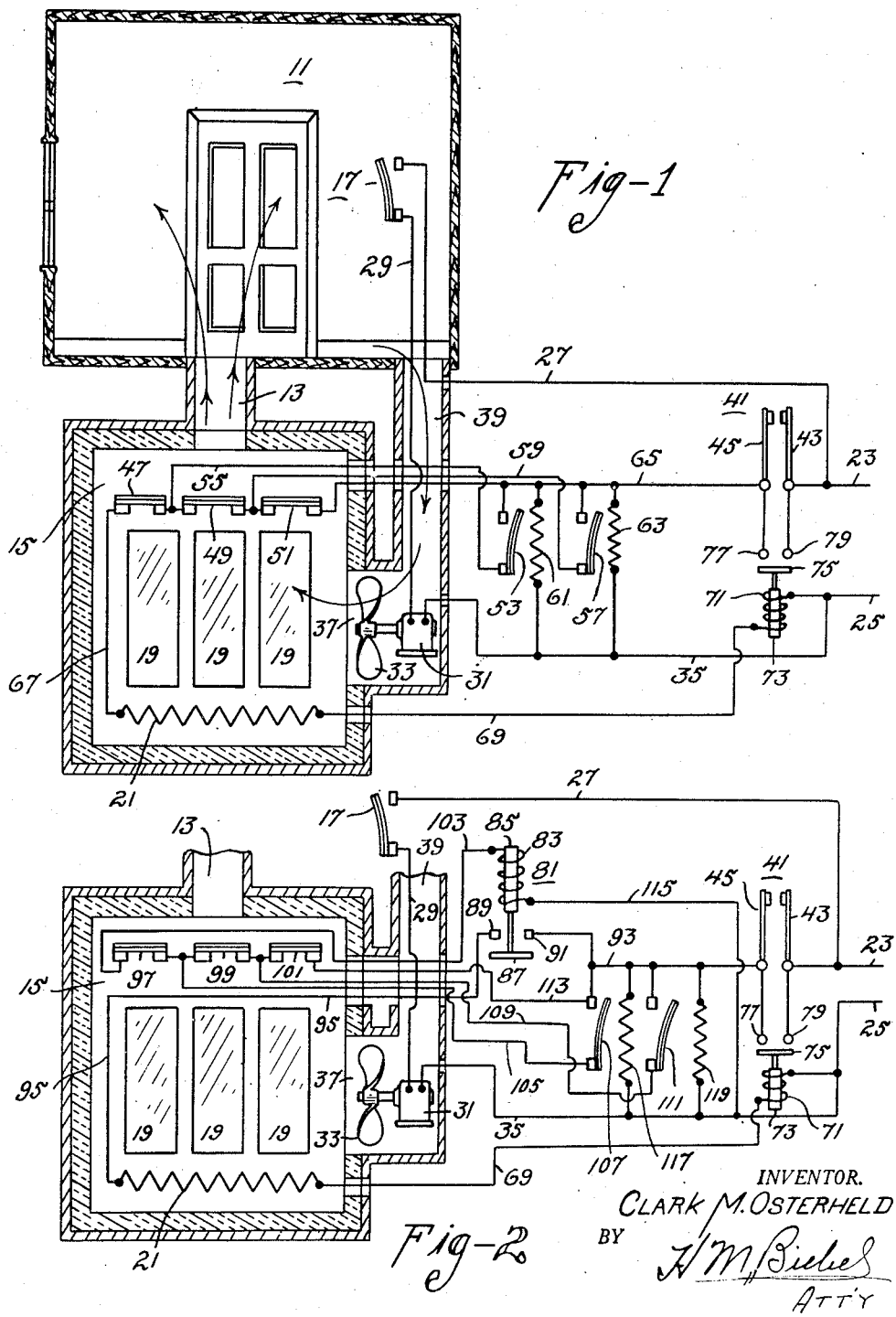
INVENTOR.
CLARK M. OSTERHELD
BY
H. M. Bielel
ATT'Y

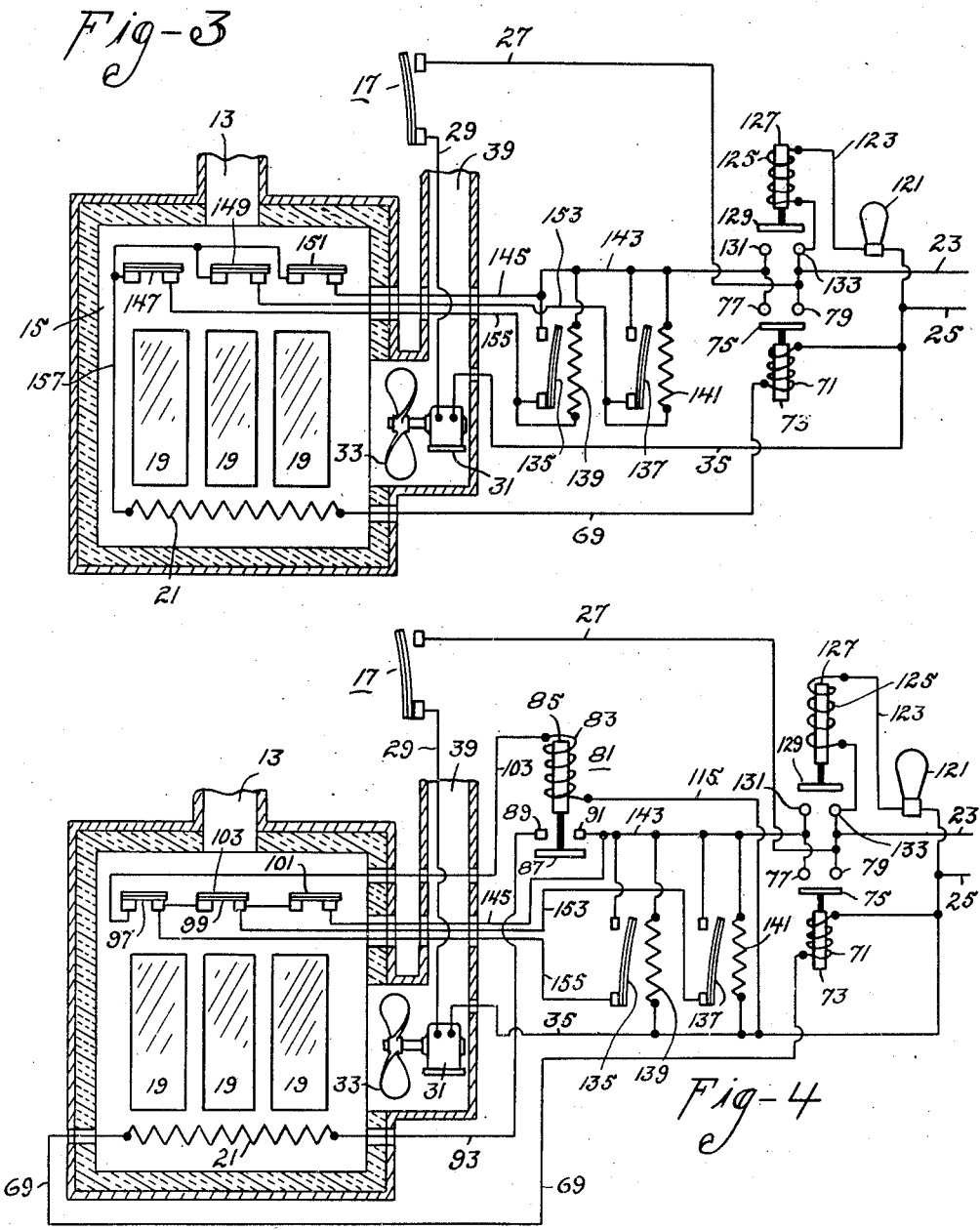

Patented Oct. 12, 1948

2,450,983

UNITED STATES PATENT OFFICE 2,450,983

HEAT STORAGE CONTROL SYSTEM

Clark M. Osterheld, Stoughton, Wis., assignor to McGraw Electric Company, Elgin, Ill., a corporation of Delaware Application April 27, 1945, Serial No. 590,655

9 Claims. (Cl. 219—20)

My invention relates to house heating systems and particularly to systems for controlling the storage of electrically generated heat in heat storage masses.

An object of my invention is to provide a control system for controlling the energization of an electric heater associated with a heat storage mass for generating and storing heat mainly during the night.

Another object of my invention is to provide a control system for generating and storing heat in heat storage masses, which system is operative to cause a fixed delay period after either the start of darkness or of an off-peak period, the length of such delay period being different in accordance with the temperature of the heat storage mass and being shorter the lower the temperature of the heat storage mass.

Another object of my invention is to provide a control system for storing heat in heat storage masses operative to cause a continuation of the energization of an electric heater and to have a continuation of the storage of heat after the start of daylight or the start of an on-peak period in case the temperature of the heat storage mass is still below a predetermined maximum value at the start of daylight or the start of an on-peak period, such energization continuing until the temperature of the heat storage mass reaches a predetermined desired maximum value.

Other objects of my invention will either be apparent from a description of several forms of systems embodying my invention or will be pointed out in the course of such description and set forth in the appended claims.

In the drawings,

Figure 1 is a diagram of connections for the control of the heating current traversing an electric heater over the contacts of thermal switches and an off-peak time controlled switch, Fig. 2 is a similar diagram of connections showing the use of an electro-magnetic control switch, the energization of which is controlled by a plurality of thermal switches, Fig. 3 is a diagram of connections showing the use of a light-sensitive cell for controlling the energization of the electric heater, and, Fig. 4 is a somewhat similar diagram of connections embodying a second electro-magnetic heater control switch, controlled by a plurality of thermal switches.

Referring first of all to Fig. 1 of the drawings, I have there shown generally only a room 11 having a hot air inlet conduit 13, which conduit is connected with a closed chamber 15 in which the heat storage mass and certain control devices to be hereinafter described may be located. It is to be understood that the representation of a room 11 is to be taken as representation of any number of rooms, the temperature of which is to be maintained at predetermined points during a twenty-four-hour day by a thermostat 17, the use and connections of which will be hereinafter set forth in detail.

The storage chamber 15 may be filled with a mass 19 of a suitable heat storage material which is adapted to be heated by one or more electric heaters 21. While I have illustrated the heat storage mass 19 as well as the electric heater 21 schematically only, I desire it to be understood that the design and construction of either the heat storage mass or of the electric heater constitutes no part of my present invention.

I provide a pair of supply circuit conductors 23 and 25, conductor 23 being connected to one terminal of the thermostat 17 by a conductor 27 while the other terminal of thermostat 17 is connected by a conductor 29 to one terminal of a motor 31 having a fan 33 mounted on its shaft. The other terminal of motor 31 may be connected by a conductor 35 to the second supply circuit conductor 25 either directly or indirectly. The fan 33 is adapted to be positioned in a blower opening 37 in a part of the outer wall of the chamber 15 so that upon rotation of the fan a flow of air will be established starting with the room 11 and then through a cold air conduit 39 into the chamber 15, past the heated masses 19 of heat storage material and then upwardly through the hot air inlet conduit 13 into the room 11. It is obvious that when the temperature of the room 11 has reached a predetermined or desired maximum that the thermostat 17 will move to the open position as shown for instance in Fig. 1 to thereby cause deenergization of the fan motor 31.

Since it is desirable and possible to energize the heater 21 with current during off-peak periods on the supply system, I provide a time controlled switch 41 comprising a pair of contact arms 43 and 45. These contact arms are adapted to be in open position during on-peak periods of a twenty-four-hour day and are adapted to be in engaged or closed position during off-peak periods, they being actuated or moved into the desired positions by a continuously operative timing means such as is now commonly used for such purposes.

I provide further a plurality of thermostats or thermal switches 47, 49 and 51 which are to be understood as being in good heat receiving relation relative to the heat storage mass 19 although not so shown. For illustrative purposes, I may point out that the thermal switch 47 is adapted to be in closed position when it is subject to temperature below a value on the order of 800° F. while it is in open position when subject to a temperature above, say 800° F. The thermal switch 49 is adapted to be in closed position when subject to temperature below 500° F. while switch 51 is adapted to be in closed position when subject to temperature below, say 200° F. while both switches are adapted to be in open position when subject to temperature of 500° F. and 200° F. respectively or over. I do not desire to be limited to the values of 800° F., 500° F. and 200° F., but merely mention them for illustrative purposes.

I provide further a thermally-actuable time delay switch comprising a bimetal bar 53 having one end thereof mounted on a fixed contact member which contact member is adapted to be connected by a conductor 55 to one terminal of switch 47 as well as to one terminal of switch 49. I provide further a second thermally actuable time delay switch comprising a bimetal bar 57 having one end thereof fixedly secured to a fixed contact member which is adapted to be connected to certain terminals of switches 49 and 51 by a conductor 59. Bimetal bar 53 has operatively associated therewith a relatively small heating coil 61 while bimetal bar 57 has operatively associated therewith a relatively small heating coil 63.

The first supply circuit conductor 23 is connected with contact arm 43 while the second contact arm 45 is connected by a conductor 65 with one terminal of heating coil 63, with one terminal of the second thermal time delay switch, with one terminal of heating coil 61, with one terminal of the first thermal time delay switch and finally with that terminal of switch 51 which is adapted to be engaged with and disengaged from the bimetal bar. The first contact of switch 47 is connected by a conductor 67 to one terminal of heater 21 while the other terminal of heater 21 is connected by a conductor 69 to one terminal of a coil 71, the other terminal of which is connected to the second supply circuit conductor 25. The coil 71 is part of an electro-magnetic switch comprising in addition an armature core 73 having connected therewith a contact bridging member 75 which is adapted to be engaged with and disengaged from two fixed contacts 77 and 79, which are respectively connected with the contact arms 45 and 43.

Let it now be assumed that contact arms 43 and 45 have been moved into engagement with each other at the start of an off-peak period which, for illustrative purposes, may be assumed to be 12 midnight. The two heating coils 61 and 63 will immeditealy be energized and it is to be understood that the wattage transformed into heat in coil 61 is such that it will cause increase of temperature of the bimetal bar 53 so that it will move into engagement with its cooperating contact member in about four hours while the wattage transformed into heat in heating coil 63 will require only two hours to cause closure of the bimetal bar 57 and engagement with the fixed contact member.

Let it be further assumed that the temperature of the heat storage mass is on the order of 600° F. so that switches 49 and 51 will be in the open position while switch 47 will be in the closed position. In about four hours after start of an off-peak period and closure of the time controlled switch 41 an energizing circuit through heater 21 will be closed traceable as follows: from supply circuit conductor 23, through the closed switch 41, conductor 65, bimetal bar 53, conductor 55, through closed switch 47, conductor 67, heater 21 and then through conductor 69 and coil 71 to the second supply circuit conductor 25. This energization of heater 21 will be effective to store additional heat in the heat storage mass 19, the time delay as well as the temperature at which switch 47 is closed and the time delay of bimetal bar 53 being so selected that in the two hours remaining of an off-peak period, which is assumed to end at 6 a. m., sufficient heat will be generated by heater 21 to cause a temperature rise of the heat storage mass to a value on the order of 800° F. If the temperature of the heat storage mass 19 should be just below the point of opening of switch 47 at the time of opening of time controlled switch 41, then the heater 21 will continue to be energized by the control switch 73, while if the temperature of the heat storage mass 19 is slightly above the value at which switch 47 opens before opening of time controlled switch 41, switch 47 will open before opening of the time controlled switch 41 and deenergize heater 21.

Let it now be assumed that greater demands were made during the preceding day for heat so that the temperature of the heat storage mass has dropped to below 500° F. at the start of an off-peak period. Then switch 47 as well as switch 49 will be in closed position, while switch 51 is still in open position. Hence the energized heating coil 63 of the bimetal bar 57 will operate within two hours to cause movement of bimetal bar 57 into closed position with the result that an energizing circuit is closed through heater 21 traceable as follows: from supply circuit conductor 23 through the closed switch 41, conductor 75, closed bimetal bar 57, conductor 59, through the two switches 49 and 47, through conductor 67, heater 21, conductor 69 through coil 71, and from there to the second supply circuit conductor 25. It is immaterial whether the temperature of the heat storage mass is 400° F., or 300° F., or any value below that at which closure of switch 49 is effected and above 200° F., closing of switch 49 and energization of the heater 21 will take place, after closure of the time control switch 41, with a time delay on the order of two hours, thereby providing plenty of time for increasing the temperature of the heat storage material to a value first over 500° F. and then over 800° F.

Now let it be assumed that the demand for heat was exhaustive as may happen on a very cold winter day, so that the temperature of the heat storage mass has been reduced at the start of an off-peak period to a value below 200° F. In this case energization of heater 21 will be effected immediately upon closure of the time control switch 41 through a circuit traceable as follows: from supply circuit conductor 23, through closed switch 41, conductor 65, then through the closed switches 51, 49, 47, through conductor 67, and heater 21, then through conductor 69 and coil 71 to the second supply circuit conductor 25. This will therefore give substantially six hours to bring up the temperature of the heat storage mass 19 to a value about 800° F., it being understood that the selection of the time delay, of the amount of energy transmitted into heat in heater 21 as well as the setting of, particularly, switch 47 is such that the desired temperature rise of the heat storage mass will be effected within an off-peak period.

Let it be assumed, however, that the call for heat has been continued during the off-peak period and that the temperature of the heat storage mass 19 was not 800° F. or slightly beyond at the time of the start of an on-peak period at or about 6:00 a. m. in the morning. It is evident that the heater current controlled coil 71 of the electro-magnetic switch will cause upward movement of the contact bridging member 75 into engagement with fixed contacts 77 and 79 and that this engagement will continue for as long as current flow through coil 71 continues. This continued current flow of the heater current through coil 71 will maintain the contact bridging member 75 in engagement with fixed contacts 77 and 79 shunting the time-controlled switch 41 and this condition will continue until the circuit through heater 21 is interrupted by switch 47 when the temperature of the heat storage mass 19 has been increased to 800° F. or over irrespective of whether the time controlled switch 41 is opened at the end of the off-peak period.

Referring now to Fig. 2 of the drawings, I have there illustrated a modified diagram of connections, in which an electro-magnetic relay 81 is employed because of the fact that the current traversing heater 21 is much greater than can be carried by bimetal bars as in the switches 47, 49, and 51. Electro-magnetic switch 81 comprises a coil 83, an armature core 85 having secured thereto a contact bridging member 87 which is adapted to be engaged with and disengaged from a pair of fixed contacts 89 and 91. Contact 91 is connected by a conductor 93 to contact arm 45, while fixed contact 89 is connected by a conductor 95 to one terminal of heater 21, the other terminal of which may be connected to coil 71 of an electro-magnetic switch by a conductor 69. I provide three thermally actuable switches comprising bimetal bars 97, 99 and 101, which are connected in series circuit relatively to each other. A conductor 103 connects the upper terminal of coil 83 to one terminal of switch 97 while the two adjacent contacts of switches 97 and 99 are connected by a conductor 105 to the fixed contact of a first thermal time delay switch comprising a bimetal bar 107. The junction of switches 99 and 101 is connected by a conductor 109 with the fixed terminal of a second time delay switch comprising a bimetal bar 111. The other fixed contacts of bimetal bars 107 and 111 are connected to conductor 93. A conductor 113 connects conductor 93 to the other terminal of switch 101. The other terminal of coil 83 is connected by a conductor 115 with conductor 35.

It is to be understood that the wattage transformed into heat in heating coils 117 and 119 operatively associated respectively with the bimetal bars 107 and 111 are such that heating coil 117 will cause closure of bimetal bar 107 in substantially four hours while heating coil 119 will cause closure of bimetal bar 111 in about two hours.

Substantially the same comments apply to Fig. 2 of the drawings as were hereinbefore made in connection with Fig. 1 of the drawings, it being understood that after closure of the time controlled switch 41 at the start of an off-peak period both heating coils 117 and 119 are energized and that they will cause closure of bimetal bars 107 and 111 after time delays on the order of four hours and of two hours respectively so that in case, for instance, the temperature of the heat storage mass 19 is on the order of 600° F., switch 97 will be closed with the result that contact bridging member 87 will be moved into engagement with fixed contacts 89 and 91 at the end of about four hours after start of an off-peak period whereby heater 21 will be energized. The operation of coil 71 of the electro-magnetically actuated switch is substantially the same as was hereinbefore set forth in connection with Fig. 1 of the drawings.

Referring now to Fig. 3 of the drawings, I have there shown the use of a light-sensitive cell 121 to fix the time when energization of the heater 21 is to be prevented, at least during a part of such time. Light-sensitive cell 121 is of the kind which becomes conductive during daylight hours and becomes non-conductive during darkness and it is to be understood that light-sensitive cell 121 is subject to daylight and to darkness. One terminal of light-sensitive cell 121 is connected to the second supply circuit conductor 25 while the other terminal is connected by a conductor 123 to one terminal of a coil 125 of an electro-magnetic relay comprising in addition to coil 125 an armature core 127, a contact bridging member 129 which is adapted to engage with and be disengaged from a pair of fixed contacts 131 and 133 of which contact 133 is connected to the first supply circuit conductor 23.

I provide further two thermally actuable time delay switches, the first comprising a bimetal bar 135 and the second comprising a bimetal bar 137 together with a small heating coil 139 for bimetal bar 135 and a small heating coil 141 for bimetal bar 137. The wattage generated in heating coil 139 operatively associated with bimetal bar 135 is such that bimetal bar 135 will be moved into engagement with its fixed contact member after a time delay on the order of seven hours while the wattage transformed into heat in heating coil 141 is such as to cause closure of bimetal bar 137 after about three hours. Conductor 143 connects fixed contact 131 with fixed contacts engaged by bimetal bars 135 and 137 as well as with a conductor 145 which is connected with a fixed contact of a third thermostat or thermal switch 151 which switch is adapted to be in open position at temperatures over 200° F., it being understood that switches 147, 149 and 151 are in close heat-receiving relation with heat storage mass 19. Conductor 153 connects one terminal of switch 149 to the fixed terminal of bimetal bar 137 while conductor 155 connects the fixed contact of bimetal bar 147 with fixed contact of bimetal bar 135 as well as with one terminal of heating coil 139, the other terminal of which is connected to conductor 143. A conductor 157 connects the contacts on which the bimetal bars of switches 147, 149 and 151 are mounted to one terminal of heater 21, the other terminal of which is connected by a conductor 69 to one terminal of coil 71 of an electro-magnetic switch.

Let it now be assumed that the temperature of the heat storage mass 19 is on the order of 600° F. with the result that switch 147 will be closed while switches 149 and 151 will be opened. As soon as darkness falls the light-sensitive cell 121 becomes non-conducting with the result that contact bridging member 129 drops into engagement with fixed contacts 131 and 133. This effects energization of the heating coils 139 and 141 with the result that at the end of seven hours the bimetal bar 135 has been moved into engagement with its fixed contact member whereby an energizing circuit through heater 21 is closed, traceable as follows: from supply circuit conductor 23, through the engaged contacts 131, 133 and contact bridging member 129, through conductor 143, through the closed bimetal bar 135, conductor 155, through the bimetal bar of switch 147, conductor 157, heater 21, through conductor 69 and coil 71 to the second supply circuit conductor 25. Since the bimetal bar 149 is out of engagement with its co-operating contact, the closure of bimetal bar 137 at the end of three hours will have no effect on heater 21.

The reason that the design, construction and adjustment of coil 139 and its effect upon bimetal bar 135 is different from those shown in Figs. 1 and 2 is because of the fact that darkness falls in the late afternoon hours during mid-winter so that it is desirable to have a longer time delay period after fall of darkness than after the start of an off-peak period.

Substantially the same further comments apply to Fig. 3 of the drawings as were made hereinbefore in regard to the diagrams of Figs. 1 and 2 respectively and it is not thought necessary to repeat them.

Referring now to Fig. 4 of the drawings, I have there shown a modified diagram of connections embodying an electro-magnetic heater circuit control switch 81 which may be substantially the same as that shown in Fig. 2 of the drawings.

Let it now be assumed that the temperature of the heat storage 19 is on the order of 600° at the fall of darkness. As soon as the light-sensitive cell 121 becomes non-conducting contact bridging member 129 will drop into engagement with fixed contacts 131 and 133 thereby closing a circuit through the heating coils 139 and 141. Heating coil 139 will cause closure of bimetal bar 135 after a time delay on the order of seven hours and since only switch 97 is closed while switches 99 and 101 are open, the quicker closure of bimetal bar 137 which may close after a time delay on the order of three hours, has no effect upon energization of the heater 21. When after seven hours' delay the bimetal bar 135 closes, it causes energization of the coil 83 with engagement of the contact bridging member 87 with fixed contacts 89 and 91, which closes an energizing circuit through heater 21, traceable as follows: from supply circuit conductor 23, through fixed contacts 131, 133 and contact bridging member 129, through conductor 143, through contact bridging member 87 and fixed contacts 89 and 91, through conductor 93, heater 21, and through conductor 69, coil 71 to the second supply circuit conductor 25.

Substantially the same comments as made hereinbefore in connection with Fig. 1, and particularly Fig. 2 of the drawings, apply equally well here and it is not thought necessary to repeat them. In case of break of daylight before the temperature of the heat storage mass 19 has reached 800° F. or slightly over, the heater-current controlled coil 71 of the electromagnetic switch, the contact bridging number of which is in engagement with the fixed contacts will continue energization of heater 21 until such time when the temperatures of the heat storage mass 19 has reached a value sufficiently high to cause disengagement between the bimetal bar of switch 97 and its fixed contact member whereby energization of coil 83 is interrupted whereby the entire system is deenergized.

It is therefore obvious that the various systems shown in the drawings and described in the specification are effective to prevent energization of the electric heater associated with the heat storage mass except during the night and in the case of certain of said diagrams of connections during a predetermined part of the night, namely the off-peak period.

It is further obvious that the various systems of control shown in Figs. 1 to 4 inclusive are effective to continue the energization of the heater operatively associated with a heat storage mass, into either the period of daylight or into the on-peak period in case the temperature of the heat storage mass is below a predetermined desired value at daybreak or at the end of an off-peak period.

Further modifications may be made in the systems embodying my invention without departing from the spirit and scope thereof and all such modifications clearly coming within the scope of the appended claims shall be considered a part of my invention.

I claim as my invention:

1. An off-peak heat storage system for heating a heat storage mass, comprising an electric heater for said mass, a light-sensitive cell subject to daylight and to darkness, a plurality of thermostats in a close heat-receiving relation to said heat-storage mass and adapted to move to closed position at different temperature values of said heat storage mass, a plurality of time delay relays electrically connected in series electric circuit with certain of said thermostats, each relay comprising a normally open thermally-actuable member and a heating coil therefor, and a switch controlled by said light-sensitive cell for energizing the heating coils of time-delay relays after fall of darkness to cause closure of said thermally-actuable member after a predetermined period of time, and energization of said electric heater.

2. An off-peak heat storage system for heating a heat storage mass, comprising an electric heater for said mass, a light-sensitive cell subject to daylight and to darkness, a plurality of thermostats in close heat-receiving relation to said heat-storage mass and adapted to move to closed position at different temperature values of said heat storage mass, a plurality of time delay relays electrically connected in series electric circuit with certain of said thermostats, each relay comprising a normally open thermally-actuable member and a heating coil therefor, and a switch controlled by said light-sensitive cell for energizing the heating coils of time-delay relays after fall of darkness to cause closure of said thermally-actuable member after a predetermined period of time and energization of said electric heater, said period of time decreasing with decrease of temperature of the heat storage mass.

3. An off-peak heat storage system for heating a heat storage mass, comprising an electric heater for said mass, a light-sensitive cell subject to daylight and to darkness, a plurality of thermostats in close heat-receiving relation to said heat-storage mass and adapted to move to closed position at different temperature values of said heat storage mass, a first electromagnetic switch controlled by said light-sensitive cell and adapted to be in open position when said light-sensitive cell is subject to daylight, a second electromagnetic switch connected in series electric circuit with said first electromagnetic switch, said two electromagnetic switches being adapted to jointly control the energization of said heater, a plurality of time delay relays electrically connected in series electric circuit with certain of said thermostats and with the coil of said second electromagnetic switch, each time delay relay comprising a normally open thermally-actuable member and a heating coil adapted to be energized by said first electromagnetic switch after fall of darkness to cause closure of said thermally-actuable members after different predetermined periods of time and energization of said electric heater upon closure of that thermally-actuable member adapted to being closed in the shortest period of time.

4. An off-peak heat storage system for heating a heat storage mass, comprising an electric heater for said mass, a light-sensitive cell subject to daylight and to darkness, an electromagnetic switch controlled by said cell and adapted to be in closed position after fall of darkness and adapted to control the energization of said electric heater, a plurality of thermostats, positioned in close heat-receiving relation to said heat storage mass and adapted to move into closed position at temperatures on the order of 800° F., 500° F. and 200° F. respectively, time delay relays electrically connected in series circuit with said thermostats closing at 800° F. and 500° F. respectively, each time delay relay including a normally open thermally-actuable member and a heating coil adapted to be energized upon closure of said first electromagnetic switch to cause closure of its associated thermally-actuated member after a predetermined period of time and energization of the electric heater, the length of said period of time decreasing with decrease of temperature of the heat storage mass at fall of darkness.

5. A system as set forth in claim 4 in which the thermostat adapted to close at 200° F. is connected directly in series with said electromagnetic switch to cause energization of said electric heater immediately upon closure of said electromagnetic switch at nightfall.

6. A heat storage system for heating a heat storage mass, comprising an electric heater for said mass, an electric circuit for said heater having a switch therein, means for causing said switch to be in open position for part of a twenty-four-hour day and in closed position for the rest of said twenty-four-hour day, means controlled jointly by said first mentioned means and by the temperature of the heat storage mass for selectively causing energization of said heater after different lengths of time after closure of said switch in accordance with the temperature of the heat storage mass, heater-current controlled switching means connected in shunt with said switch for continuing energization of said heater after opening of said switch in case the temperature of the heat storage mass is below a predetermined value at that time.

7. A heat storage system for heating a heat storage mass, comprising an electric heater for said mass, an electric circuit for said heater, a switch in said circuit, means for causing said switch to be in open position for part of a twenty-four-hour day and in closed position for the rest of said twenty-four-hour day, means controlled jointly by said first named means and by the temperature of the heat storage mass for selectively causing energization of said heater a first predetermined length of time after closure of said switch in case the temperature of said heat storage mass is above a predetermined value and a second predetermined length of time after closure of said switch in case the temperature of said heat storage mass is below said predetermined value, heater-current controlled switching means connected in shunt with said switch for continuing energization of said heater after opening of said switch in case the temperature of the heat storage mass is below a predetermined maximum value at that time, the energization continuing until the temperature of the heat storage mass has reached said predetermined maximum value.

8. A heat storage system for heating a heat storage mass, comprising an electric heater for said mass, and an electric circuit for said heater having a switch therein, means for causing said switch to be in open position for part of a twenty-four-hour day and in closed position for the rest of said day, a plurality of thermostats in close heat-receiving relation to said heat storage mass and adapted to move to closed position at different temperature values thereof, a plurality of time-delay relays connected in series electric circuit with certain of said thermostats, each relay comprising a normally-open thermally-actuable member and a heating coil adapted to be energized upon closure of said switch to cause closure of said thermally-actuable member after a predetermined period of time, and energization of said electric heater.

9. The combination of the immediately preceding claim wherein said switch is controlled by a clock.

CLARK M. OSTERHELD.

REFERENCES CITED

The following references are of record in the file of this patent:

. UNITED STATES PATENTS

| Number | Name | Date |
| --- | --- | --- |
| 2,238,624 | Clark | Apr. 15, 1941 |
| 2,266,146 | Biebel | Dec. 16, 1941 |
| 2,266,147 | Biebel | Dec. 16, 1941 |
| 2,368,774 | Osterheld | Feb. 19, 1945 |
| 2,377,440 | Osterheld | June 5, 1945 |